April 26, 1955 A. C. STOVER 2,707,110
FLUID PRESSURE SPRING SUSPENSION FOR VEHICLES
Filed Nov. 14, 1949 2 Sheets-Sheet 1
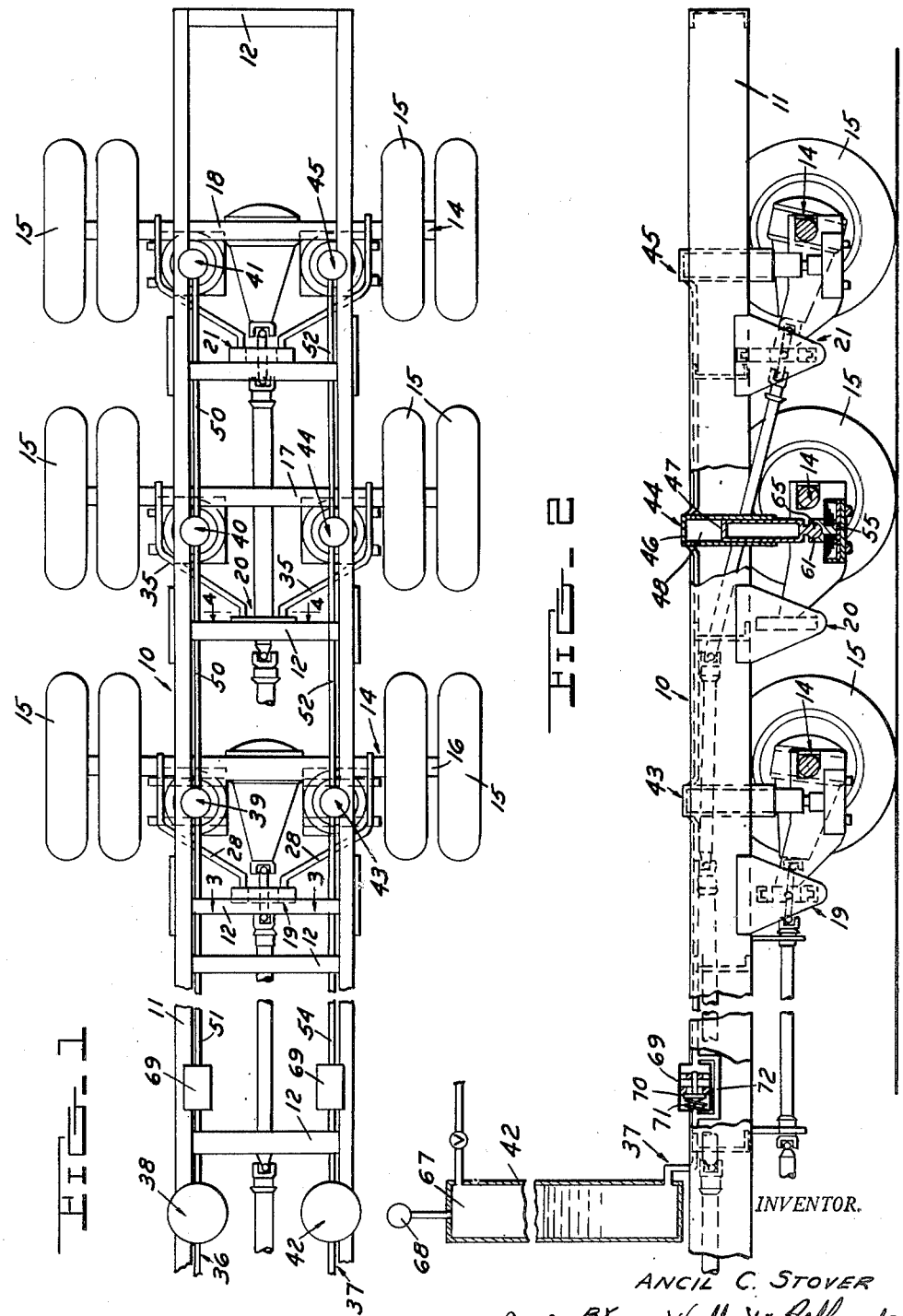
INVENTOR.
ANCIL C. STOVER
BY Whittemore, Hulbert & Belknap
ATTORNEYS April 26, 1955 A. C. STOVER 2,707,110
FLUID PRESSURE SPRING SUSPENSION FOR VEHICLES
Filed Nov. 14, 1949 2 Sheets-Sheet 2
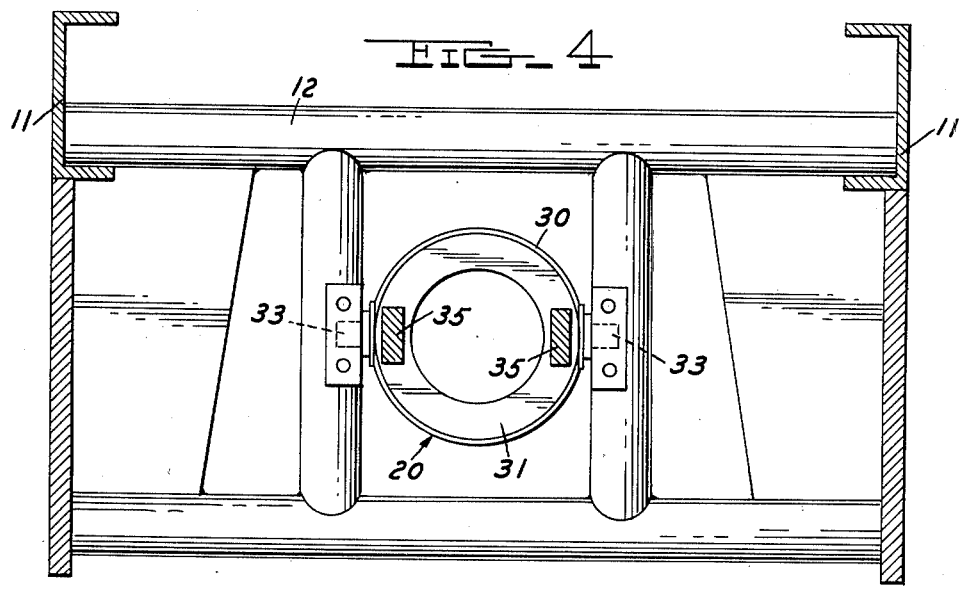
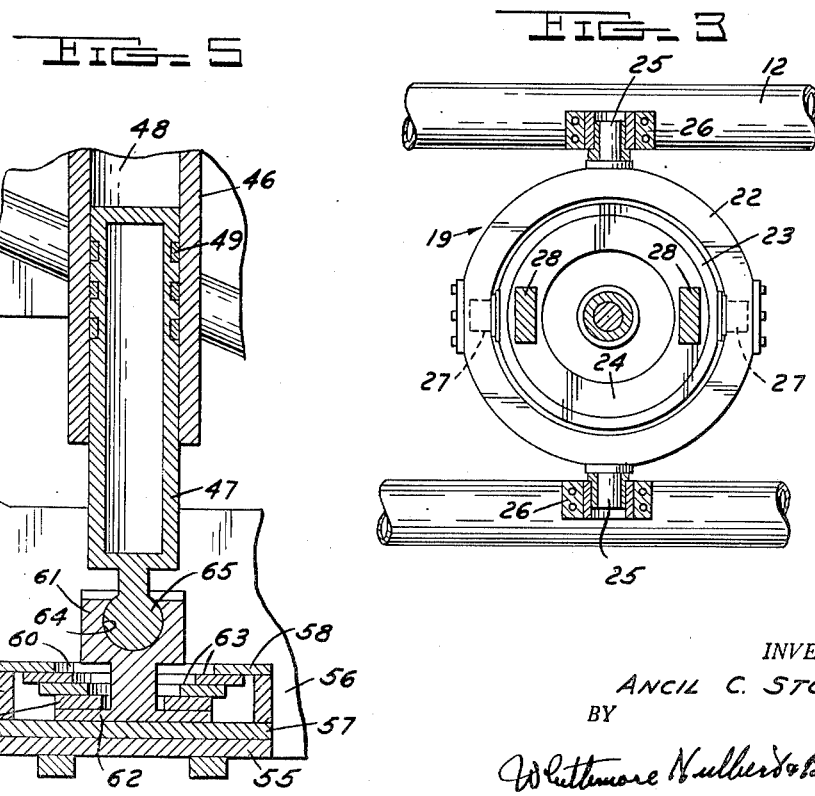
INVENTOR.
ANCIL C. STOVER
BY
ATTORNEYS ; # United States Patent Office 2,707,110
Patented Apr. 26, 1955

2,707,110

FLUID PRESSURE SPRING SUSPENSION FOR VEHICLES

Ancil C. Stover, Van Wert, Ohio, assignor to William W. Eisenhauer, William P. Ellwood, Ida J. Eisenhauer, and Leigh E. Eisenhauer, copartners, doing business as The Eisenhauer Manufacturing Company, Van Wert, Ohio Application November 14, 1949, Serial No. 127,071

5 Claims. (Cl. 280—104.5)

This invention relates generally to vehicles of the type having one or more axles or equivalent ground engaging wheel supporting members, and refers more particularly to improved means for supporting the vehicle frame on the axle or axles.

It is an object of this invention to improve the "ride" of the vehicle frame or load by employing fluid displacement devices for supporting the frame on the axle or axles. In accordance with this invention, two independent hydraulic displacement systems respectively connect opposite end portions of an axle to the frame. Each system has a source of supply of non-compressible fluid under a yielding pressure, and has at least one displacement device which comprises a cylinder member and a piston member supported within the cylinder member for sliding movement. One member of each device is connected to the frame, and the other member of each device is connected to the axle.

The sources of supply are respectively connected to the variable volume spaces formed in the cylinder members by the piston members, and these spaces as well as the associated fluid connections are filled with the noncompressible fluid medium. The arrangement is such that relative vertical movement of the frame and axle toward one another reduces the volume of the variable volume spaces and displaces the fluid from the latter into the sources of supply. On the other hand relative movement of the frame and axle away from one another increases the size of the variable volume spaces enabling the yielding pressure acting on the fluid medium at the sources of supply to flow the fluid from the sources of supply to the variable volume spaces.

The fluid suspension noted above renders it possible to eliminate the conventional suspension springs and their variable rate characteristics. Also by reason of the above arrangement, the yielding pressure at the sources of supply varies in proportion to the load, so that the load may be determined by measuring the yielding pressure at the sources of supply. In addition the yielding pressure acting on the non-compressible fluid medium at the sources of supply may be varied to obtain a uniform standing height of the frame regardless of load or other contributing factors.

It is another object of this invention to effectively retard succeeding motion of the frame caused by stored energy in the suspension after the wheel has passed over an irregularity in the road, for example. This feature is accomplished by restricting the rate of flow of the fluid medium from the sources of supply to the variable volume spaces relative to the flow of fluid medium from the variable volume spaces to the sources of supply.

It is still another object of this invention to provide a connection between the axle and displacement devices enabling both pivotal and lateral shifting movement of the devices relative to the axle. This construction is highly advantageous in instances where the axle is mounted for turning movement as well as vertical and tipping movements relative to the frame, since it reduces any stress on the parts resulting from either, or a combination of, said movements.

The foregoing as well as other objects will be made more apparent as this description proceeds, especially when considered in connection with the accompanying drawing, wherein:

Figure 1 is a fragmentary plan view illustrating a vehicle chassis embodying the features of this invention;

Figure 2 is a side elevational view partly in section of the construction shown in Figure 1;

Figure 3 is a cross sectional view taken on the line 3—3 of Figure 1;

Figure 4 is a cross sectional view taken on the line 4—4 of Figure 1; and

Figure 5 is an enlarged sectional view of a part of the vehicle suspension system.

The present invention may be used to advantage in connection with practically any type of road vehicle, wherein it is desired to provide controlled relative movement between the vehicle frame and one or more supporting axles. However, for the purpose of illustrating the present invention, I have selected the vehicle shown in Figures 1 and 2 of the drawings. It will be noted that this vehicle has a chassis frame 10 comprising longitudinally extending side sills 11 secured in lateral spaced relationship by means of cross braces 12.

The chassis frame 10 is supported by a plurality of axles 14 having ground engaging wheels 15 suitably supported on opposite ends thereof. The axles 14 extend transversely of the frame beneath the latter, and are spaced from each other in the direction of length of the frame. The number of axles provided depends on the character of the vehicle; and for the purpose of the present illustration, three axles 16, 17 and 18 are shown. The axles 16 and 18 are indicated as driving axles, while the intermediate axle 17 is merely an idler axle.

The axles 16, 17 and 18 are respectively connected to the frame 10 by mountings designated generally by the reference characters 19, 20 and 21. All of the mountings are of a nature to permit relatively free movement of the axles independently of one another in an up and down direction relative to the frame, and to also permit tipping of the axles in substantially vertical planes relative to the frame. The mountings 19 and 21 are also of a nature to enable the axles 16 and 18 to turn independently of one another about substantially vertical axes.

The mountings 19 and 21 are identical in construction, so that a description of one will suffice for both. The mounting 19 is shown in Figure 3 of the drawing, and comprises an outer ring 22, an inner ring 23, and an annular member 24 suitably rotatably supported within the inner ring 23. The outer ring 22 has a pair of trunnions 25 respectively secured to the top and bottom portions of the ring with their axes in vertical alignment. The trunnions 25 are respectively journalled in suitable bearings 26 supported on the adjacent cross member 12 in a manner to enable turning movement of the ring 22 about the vertical axis of the trunnions 25.

The inner ring 23 has trunnions 27 at diametrically opposite sides, and arranged with their axes aligned in a substantially horizontal plane. The trunnions 27 are respectively journalled on opposite sides of the outer ring 22 in a manner to enable rocking movement of the inner ring 23 about a substantially horizontal axis relative to the outer ring 22.

The annular member 24 is supported within the inner ring 23 for rotation about the axis of the inner ring, and is movable as a unit with the inner ring about the trunnions 27. As shown in Figure 1 of the drawings, the opposite end portions of the axle 16 are connected to diametrically opposite sides of the annular member 24 by struts or arms 28. Thus the axle 16 is capable of turning movement relative to the frame about the vertical axis of the trunnions 25, swinging movement relative to the frame about the horizontal axis of the trunnions 27, and tipping movement in a substantially vertical plane relative to the frame about the axis of the inner ring 23. Inasmuch as the mounting 21 is identical to the mounting 19, it follows that the axle 18 may partake of the same movements as the axle 16. The mounting of these two axles in a manner such as to permit independent turning movement of the same about substantially vertical extending axes enables the axles to turn in either direction with the vehicle. The turning force is applied to the axles by reason of the frictional engagement of the tires on the ground engaging wheels 15 with the road surface, and in the present instance, the axles 16 and 18 turn in opposite directions about their respective vertical axes when the vehicle is turned from a straight course of travel. In practice it is desirable to interconnect the turning axles in a manner such that both axles are compelled to turn throughout the same angular travel. Interconnecting means for this purpose is not shown herein, but may be the same as shown and described in my copending application Serial No. 119,223, filed October 3, 1949, since issued as Patent No. 2,681,812, dated June 22, 1954. Such interconnecting means also incorporates means for locking the steering axles against turning movement, so that the vehicle may be operated in reverse without difficulty. However, this arrangement forms no part of the present invention, and accordingly, is not shown herein.

The mounting 20 for the axle 17 is shown in Figure 4 of the drawing. This mounting comprises a ring 30 and an annular member 31 supported on the ring within the latter for rotation about the axis of the same. The ring 30 has a pair of trunnions 33 at diametrically opposite sides arranged with their axes aligned in a substantially horizontal plane. The trunnions 33 are respectively journalled on the adjacent cross brace 12 of the frame 10 in a manner to permit rocking movement of the ring 30 and associated annular member 31 about the horizontal axes of the trunnions 33. The opposite end portions of the axle 17 are respectively connected to diametrically opposite sides of the annular member 31 by arms 35. Thus the axle 17 may swing about the horizontal axis of the trunnions 33 and may tip in a substantially vertical plane about the axis of the ring 30.

The chassis frame 10 is supported on the axles 14 by two independently operable fluid displacement systems indicated generally in Figure 1 of the drawing by the numerals 36 and 37. The system 36 shown in Figure 1 of the drawing comprises a reservoir 38 and three displacement devices 39, 40 and 41. The system 37 also comprises a reservoir 42, and three displacement devices 43, 44 and 45. As shown in Figure 5, each displacement device comprises a cylinder 46, and a piston 47 slidably supported in the cylinder 46. The cylinder 46 is positioned vertically, and is closed at the top. The piston 47 extends into the cylinder through the lower end thereof, and provides a variable volume space 48 in the cylinder 47 above the piston. Leakage of fluid medium from the space 48 past the piston is prevented by a plurality of sealing rings 49 respectively arranged in annular grooves formed in the outer wall of the piston 47. The grooves are spaced from each other axially of the piston and the rings in the grooves frictionally engage the inner wall of the piston.

The cylinders 46 for the displacement devices 39, 40 and 41 are secured to the frame 10 at one side of the latter, and are respectively positioned adjacent the axles 16, 17 and 18. The cylinders for the devices 43, 44 and 45 are secured to the frame at the opposite side of the latter, and are also respectively positioned adjacent the axles 16, 17 and 18. The upper ends of the cylinders at one side of the chassis frame are connected together by conduits 50, and the upper end of the cylinder 46 for the device 39 is connected to the bottom of the reservoir 38 by a conduit 51. The upper ends of the cylinders 46 for the devices at the opposite side of the chassis frame are connected by conduits 52, and the cylinder 46 for the displacement device 43 is connected to the reservoir 42 by a conduit 54. Thus it will be noted that the variable volume spaces 48 in the cylinders 46 associated with each system are respectively serially connected to the reservoirs.

The lower ends of the pistons 47 associated with the displacement devices 39 and 43 are respectively connected to opposite end portions of the axle 16. The lower ends of the pistons 47 associated with the displacement devices 40 and 44 are respectively connected to opposite ends of the axle 17. The lower ends of the pistons 47 of the displacement devices 41 and 45 are respectively connected to opposite ends of the axle 18. The manner in which the lower ends of the pistons 47 are connected to their respective axles is shown in Figure 5 of the drawing. In detail a seat 55 is suitably secured to an axle bracket 56 and a wearplate 57 is supported on the seat 55. A cover plate 58 is secured to the wear plate in vertical spaced relation thereto by spacers 59, and the plate 58 has a central opening 60 therethrough for receiving a part 61. The part 61 has an enlargement 62 which is slidably mounted on the wear-plate 57 for movement relative thereto in practically all directions parallel to the wear-plate, and is held against the wear-plate by superposed rings 63. The top ring slidably engages the underside of the plate 58 around the opening 60, and the bottom ring engages the top surface of the enlargement 62 on the part 61. The intermediate ring 63 is slidably supported between the top and bottom rings in the manner clearly shown in Figure 5 of the drawing.

The part 61 has a head portion extending above the plate 58 and a spherically shaped socket 64 is formed in the upper end of the head portion. The spherically shaped socket 64 is engaged by a ball-shaped part 65, which in turn, is secured to, or forms an integral part of the lower end of the piston 47.

It follows from the foregoing that the lower end of the displacement devices have a universal pivotal connection with the parts 61, which in turn, are slidable relative to the axles in practically all directions in a horizontal plane. This form of connection between the pistons 47 and the respective axles is desirable in that it permits movement of the axles relative to the displacement devices without applying objectionable stresses on associated parts.

The two systems 36 and 37 are filled with a non-compressible fluid medium to such an extent that the reservoirs in the respective systems are partially filled with the fluid medium. The upper ends of the reservoirs are closed, to provide chambers 67 above the fluid level in the reservoirs, and the chambers 67 contain air under pressure. The air under pressure in the reservoirs acts on the non-compressible fluid medium tending to force the latter out of the reservoirs into the variable volume spaces 48 to lift the chassis frame 10. Thus the air pressure in the reservoirs is determined to locate the chassis frame at the desired elevation, and may be varied to maintain this elevation regardless of the load supported on the chassis frame. In other words, there is a definite balance between the load on the chassis frame and the two suspension systems 36 and 37. In fact the load on the chassis frame may actually be determined by measuring the pressure in the chambers 67 of the reservoirs, and suitable gauges 68 may be provided for this purpose.

In operation it will be noted that when the frame 10 and one or more of the axles 14 are relatively moved toward one another, the volume of the spaces 48 is decreased, and the non-compressible fluid medium is displaced into the reservoirs. On the other hand when the frame 10 and one or more of the axles are relatively moved in directions away from one another, the variable volume spaces 48 are increased in size, enabling fluid medium to flow from the reservoirs into these spaces. The two systems are entirely separate from one another, so that they independently control movement at opposite sides of the frame.

Located within each system is a check valve 69. As shown in Figure 2, each check valve has a valve member 70 normally held in its closed position by a spring 71. The location of the valves 70 is such that the flow of fluid medium from the reservoirs to the displacement devices is prevented, but reverse flow from the displacement devices to the reservoir is permitted. A bypass 72 is provided around each check valve to enable fluid medium to flow from the reservoirs to the displacement devices, and of course, also acts as an additional passage through which fluid medium may flow from the displacement devices to the reservoirs. It follows from the above that the flow of fluid medium from the reservoirs to the displacement devices is restricted relative to the reverse flow of fluid medium from the displacement devices to the reservoirs. This feature is advantageous in that it permits retarding succeeding motion of the chassis frame after the ground engaging wheels, for example, have passed over an irregularity in the road. In other words, the check valves and associated bypass act in much the same manner as shock absorbers to control the rebound action of the frame.

It will be noted that the fluid suspension system described above may be used in connection with practically any type of road vehicle where it is desired or essential to provide relative vertical displacement of the ground engaging wheels and load carrying frame or body structure. Also it will be apparent that while the suspension means has been shown and described as applied to the rear load supporting axles of a vehicle it may also be employed to connect the front steering wheel supporting axles to the chassis. In any case the hydraulic suspension system assures obtaining maximum stability regardless of variations in the pay load because a balance is maintained between the pay load and the action of the displacement devices supporting this load.

What I claim as my invention is:

1. In a vehicle having a frame and having an axle, means connecting the frame and axle including a fluid displacement device positioned between the axle and frame, said device having a cylinder part and a piston part supported in the cylinder part for sliding movement, means operatively connecting one part to the frame, and a connection between the other part and axle permitting sliding movement of said other part relative to the axle in directions extending transversely to each other, said connection between the said other part and axle including a seat supported on the axle, a member supported on said seat for sliding movement in substantially all directions in a plane generally parallel to said seat, and means connecting said member to said other part of said device.

2. The structure set forth in claim 1, in which said member is pivotally connected to said other part by a universal joint.

3. In a vehicle having a frame and having an axle, means connecting the frame and axle including a fluid displacement device positioned between the axle and frame, said device having a cylinder part and a piston part supported in the cylinder part for sliding movement, means operatively connecting one part to the frame, and a connection between the other part and axle permitting sliding movement of said other part relative to the axle in directions extending transversely to each other, said connection between the said other part and axle including a seat member, a second member supported on said seat member for sliding movement in substantially all directions in a plane generally parallel to said seat member, one of said members being supported on the axle, and means connecting the other member to said other part of said device.

4. In a vehicle comprising a frame and a plurality of axles extending transversely therebeneath; independently operable closed hydraulic suspension systems respectively for opposite sides of said frame and supported on opposite ends of said axles, each system including an individual hydraulic displacement member between each axle and the corresponding portion of the frame, a reservoir hydraulically connected to all of the individual displacement members of each system and also containing air under predetermined pressure for resiliently supporting the load, and means for retarding flow of hydraulic fluid from each of said reservoirs to the individual displacement members of the respective systems relative to the rate of flow from the displacement members to the reservoirs, said means comprising check valves between the reservoirs and displacement members of said respective systems, and a bypass for each check valve.

5. In a vehicle comprising a frame and a plurality of axles extending transversely therebeneath, independently operable closed hydraulic suspension systems respectively for opposite sides of said frame and supported on said axles, each system including an individual hydraulic displacement member between each axle and the adjacent portion of the frame, a reservoir hydraulically connected to all of the individual displacement members of each system and also containing air under predetermined pressure for resiliently supporting the load, and means for retarding flow of hydraulic fluid from each of said reservoirs to the individual displacement members of the respective systems relative to the rate of flow from the displacement members to the reservoirs.

References Cited in the file of this patent

UNITED STATES PATENTS

| Number | Name | Date |
|---|---|---|
| 891,328 | Cowles et al. | June 23, 1908 |
| 1,669,828 | Harley | May 15, 1928 |
| 1,792,794 | Zoelly | Feb. 17, 1931 |
| 1,835,112 | Hawkins | Dec. 8, 1931 |
| 2,094,882 | Garnett et al. | Oct. 5, 1937 |
| 2,139,178 | Stevens | Dec. 6, 1938 |
| 2,249,402 | Stefano | July 15, 1941 |
| 2,272,572 | Merry | Feb. 10, 1942 |
| 2,411,885 | Larison | Dec. 3, 1946 |
| 2,452,105 | Cosentino | Oct. 26, 1948 |